United States Patent [19]

Peters

[11] Patent Number: 5,488,865

[45] Date of Patent: Feb. 6, 1996

[54] WIDE-BAND SERVO ACCELEROMETER WITH FLAT LEAF FLEXURE SUSPENSION

[75] Inventor: Rex B. Peters, Woodinville, Wash.

[73] Assignee: AlliedSignal Inc., Morristown, N.J.

[21] Appl. No.: 290,051

[22] Filed: Aug. 15, 1994

[51] Int. Cl.⁶ .................................................. G01P 15/13
[52] U.S. Cl. .......................................................... 73/514.23
[58] Field of Search .............................. 73/517 B, 517 R

[56] References Cited

U.S. PATENT DOCUMENTS

| | | | |
|---|---|---|---|
| Re. 34,631 | 7/1994 | Norling | 73/517 B |
| 4,144,765 | 3/1979 | Aske | 73/517 B |
| 4,182,187 | 1/1980 | Hanson | 73/497 |
| 4,250,757 | 2/1981 | Hanson | 73/517 B |
| 4,345,474 | 8/1982 | Deval | 73/517 B |
| 4,372,162 | 2/1983 | Shutt | 73/517 B |
| 4,394,405 | 7/1983 | Atherton | 427/58 |
| 4,399,700 | 8/1983 | Hanson | 73/517 B |
| 4,400,979 | 8/1983 | Hanson et al. | 73/517 B |
| 4,441,366 | 4/1984 | Hanson | 73/517 B |
| 4,555,944 | 12/1985 | Hanson et al. | 73/517 B |
| 4,555,945 | 12/1985 | Hanson | 73/517 B |
| 4,592,234 | 6/1986 | Norling | 73/517 B |
| 4,611,491 | 9/1986 | Brown et al. | 73/517 B |
| 4,620,442 | 11/1986 | MacGugan et al. | 73/517 R |
| 4,634,965 | 1/1987 | Foote | 324/60 C |
| 4,697,455 | 10/1987 | Norling | 73/497 |
| 4,726,228 | 2/1988 | Norling | 73/517 B |
| 4,932,258 | 6/1990 | Norling | 73/497 |
| 4,944,184 | 7/1990 | Blake et al. | 73/514 |
| 5,024,089 | 6/1991 | Norling | 73/517 B |
| 5,085,079 | 2/1992 | Holdren et al. | 73/517 B |
| 5,090,243 | 2/1992 | Holdren et al. | 73/514 |
| 5,097,172 | 3/1992 | Becka | 310/348 |
| 5,111,694 | 5/1992 | Foote | 73/497 |
| 5,182,949 | 2/1993 | Rupnick et al. | 73/517 B |
| 5,203,210 | 4/1993 | Terry et al. | 73/517 B |
| 5,212,984 | 5/1993 | Norling et al. | 73/493 |
| 5,220,831 | 6/1993 | Lee | 73/497 |

*Primary Examiner*—Hezron E. Williams
*Assistant Examiner*—Richard A. Moller

[57] ABSTRACT

A servo accelerometer includes a proof mass suspended by way of a flat leaf flexure suspended between upper and lower excitation rings. Electrically conductive material forming pick-off capacitance plates is disposed on opposing sides of the proof mass to form capacitive elements with respect to the excitation rings which, in turn, forms a position detector. In response to a force or acceleration along a sensitive axis (i.e., generally normal to the plane of the proof mass), the proof mass is displaced relative to the excitation rings causing a change in the capacitance of the capacitive elements. A servo system, which includes one or more electromagnets, returns the proof mass to its null or at rest position. In order to compensate for the transverse bending of the flat leaf flexure which results in the proof mass having two degrees of freedom, the accelerometer is configured such that the two degrees of freedom respond like a single degree of freedom with respect to the servo system. In particular, the accelerometer is configured such that the centroid of the position detector is disposed as near as possible to the center of percussion, which minimizes the dynamic sensitivity of the accelerometer to the location of the center of force which, in turn, allows the center of force to be moved near the center of mass for optimized static performance. By moving the center of force close to the center of mass and, therefore, near the center of percussion, sensitivity of the accelerometer to production variations in the position of the centroid of the position detector is minimized.

9 Claims, 8 Drawing Sheets

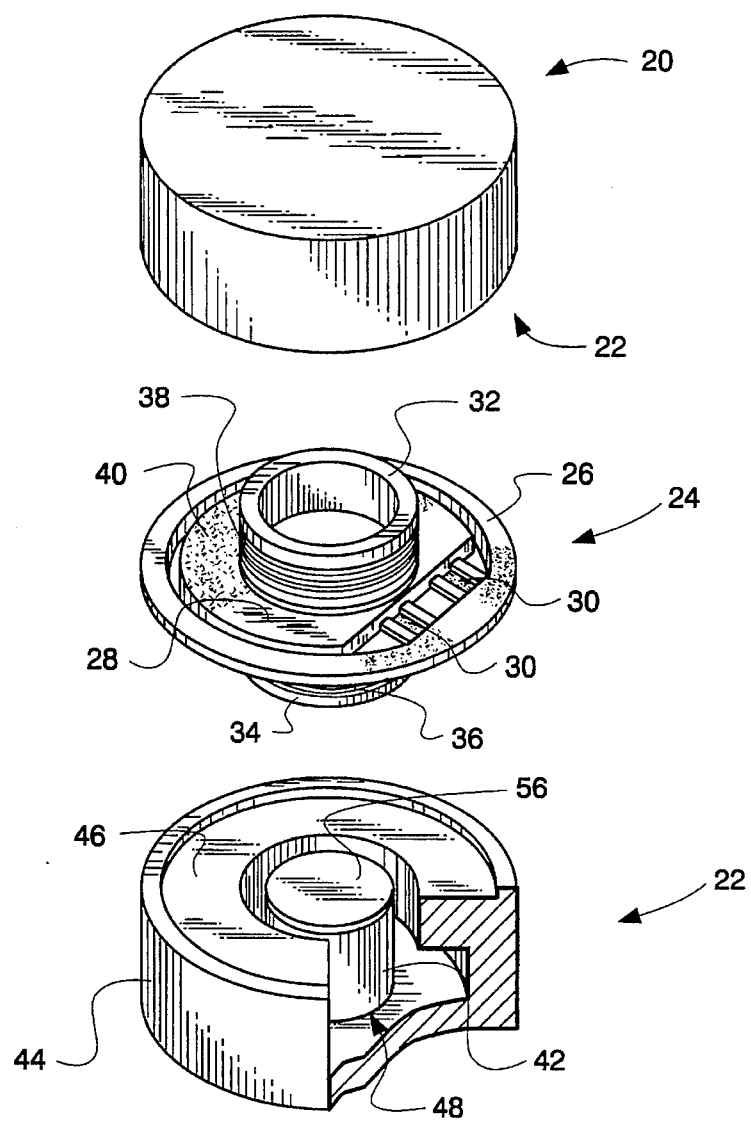
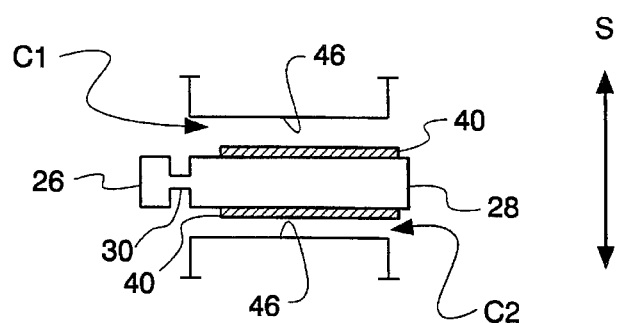
Fig. 1
Fig. 2

WIDE-BAND SERVO ACCELEROMETER WITH FLAT LEAF FLEXURE SUSPENSION

BACKGROUND OF THE INVENTION

1. Field of the Invention

The present invention relates to an accelerometer and, more particularly, to a wide-band servo accelerometer with a flat leaf flexure.

2. Description of the Prior Art

Servo accelerometers (also known as force rebalance accelerometers) which include one or more electromagnet assemblies, which return the accelerometer to a null position in response to an acceleration or force input, are generally known in the art. Examples of such accelerometers are disclosed in U.S. Pat. Nos. 4,182,187; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; and 5,220,831, all herein incorporated by reference. Such servo accelerometers normally include a proof mass, known to be formed from amorphous quartz, suspended by one or more flexures, which restrain the proof mass to a single degree of freedom, to enable the proof mass to deflect in response to forces or accelerations along a sensitive axis; generally perpendicular to the plane of the proof mass. At rest, the proof mass is normally suspended equidistantly between upper and lower excitation rings. Electrically conductive material forming pick-off capacitance plates is disposed on opposing sides of the proof mass to form capacitive elements with the excitation rings. As will be discussed in more detail below, the capacitive elements act as a position detector for the proof mass to provide a signal representative of the displacement of the proof mass from a null position. In particular, an acceleration or force applied along the sensitive axis causes the proof mass to deflect either upwardly or downwardly which, in turn, causes the distance between the pick-off capacitance plates and the upper and lower excitation rings to vary. This change of the distance between the pick-off capacitance plates and the upper and lower excitation rings causes a change in the capacitance of the capacitive elements. The difference in the capacitances of the capacitance elements is thus representative of the displacement of the proof mass along the sensitive axis. This displacement signal is applied to a torque to balance servo system (also known as a torquer or forcer) that includes one or more electromagnets which return the proof mass to its null or at rest position to further restrain the single degree of freedom of the proof mass. The magnitude of the drive currents applied to the electromagnets, in turn, is representative of the acceleration or force along the sensitive axis.

The proof mass or pendulum in such servo accelerometers is known to be suspended by either a pivot jewel or a flexure. For a relatively broad range of applications, flexure suspension is known to be preferred because of the many benefits over the pivot jewel suspension, including stepless bias response for accuracy in low vibration environments. Flexures also have no wear-out mode; are relatively less labor intensive to produce than pivot jewel suspensions; and are better suited to high volume process control production.

There are two known types of flexure suspension; circular arc flexures and flat leaf flexures. For a given angular stiffness, circular arc flexures are extremely short and have relatively low transverse compliance which reduces suspension errors. However, such circular arc flexures are relatively thin and fragile unless formed from relatively high strength materials which makes such flexures relatively expensive to produce. Flat leaf flexures, on the other hand, are relatively long and thick, and offer a geometry that is compatible with batch process etching techniques. The flat leaf flexures are rugged and tolerant, even when fabricated from relatively low strength materials due to their thickness. However, such flat leaf flexures are prone to suspension errors due to their relatively large transverse compliance, known as "S" bending. Although the ruggedness of flat leaf flexures and their compatibility with batch etching techniques makes the flat leaf flexures the choice for quartz accelerometers, the relatively large transverse compliance can result in cross-coupling errors, as well as mechanical limits to the servo acceleration which heretofore has made such flat leaf flexures undesirable.

SUMMARY OF THE INVENTION

It is an object of the present invention to provide a servo accelerometer which solves various problems known in the prior art.

It is another object of the present invention to provide a servo accelerometer which includes a flat leaf flexure suspension.

Briefly, the present invention relates to a servo accelerometer which includes a proof mass suspended equidistantly by way of a flat leaf flexure suspended between upper and lower excitation rings. Electrically conductive material forming pick-off capacitance plates is disposed on opposing sides of the proof mass to form capacitive elements with respect to the excitation rings which, in turn, forms a position detector. In response to a force or acceleration along a sensitive axis (i.e., generally normal to the plane of the proof mass), the proof mass is displaced relative to a mounting ring causing a change in the capacitance of the capacitive elements. A servo system or torquer, which includes one or more electromagnets, returns the proof mass to its null or at rest position. The drive current used to return the proof mass to a null position is representative of the displacement. In order to compensate for the transverse bending of the flat leaf flexure which results in the proof mass having two degrees of freedom, the accelerometer is configured such that the two degrees of freedom respond like a single degree of freedom with respect to the servo system. In particular, the accelerometer is configured such that the centroid of the position detector is disposed as near as possible to the center of percussion of the proof mass, which minimizes the dynamic sensitivity of the accelerometer to the location of the center of force of the torquer which, in turn, allows the center of force of the torquer to be moved near the center of mass of the proof mass for optimized static performance. By moving the center of force close to the center of mass and, therefore, near the center of percussion, sensitivity of the accelerometer to production variations in the position of the centroid of the position detector is minimized.

DESCRIPTION OF THE DRAWINGS

These and other objects of the present invention will be readily understood with reference to the following specification and attached drawings wherein:

FIG. 1 is an exploded perspective view of a servo accelerometer;

FIG. 2 is a simplified cross sectional view of the servo accelerometer illustrated in FIG. 1;

DETAILED DESCRIPTION OF THE PREFERRED EMBODIMENT

Figure 3:
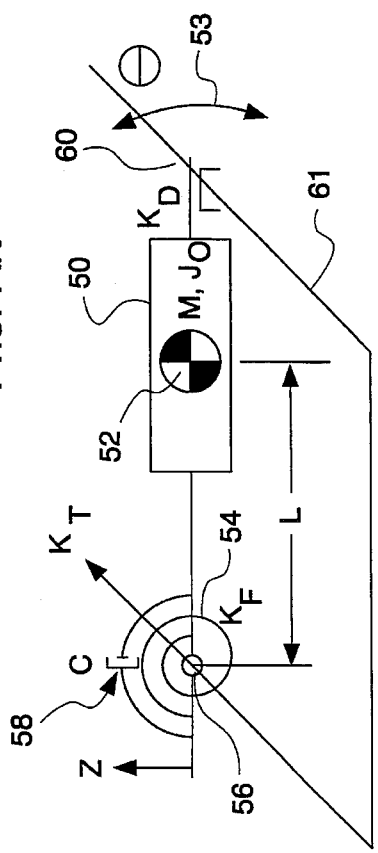
FIG. 3 is a mechanical model of an idealized servo accelerometer having a single degree of freedom.

FIG. 1 illustrates a servo accelerometer, generally identified with the reference numeral 20. The servo accelerometer 20 includes one or more electromagnet assemblies 22 (also known as forcers or torquers) and a proof mass assembly 24. The proof mass assembly 24 includes a mounting ring 26 and a generally paddle-shaped proof mass 28. The proof mass 28 is suspended relative to the mounting ring 26 by way of a pair of flat leaf flexures 30 defining a hinge axis to enable the proof mass 28 to rotate relative to the mounting ring 26. Cylindrically-shaped bobbins 32 and 34 are formed on opposing surfaces of the proof mass 28. These bobbins 32 and 34 are used to carry torquer coils 36 and 38. Conductive material 40 is deposited on the opposing surfaces of the proof mass 28 to form pick-off capacitance plates.

The magnet assemblies 22 include a permanent magnet 42 and a generally cylindrical excitation ring or flux concentrator 44. The excitation ring 44 is normally configured to have a generally C-shaped cross section. The material for the excitation ring 44 is known to be selected to have a relatively high permeability, such as Invar, to form a magnetic return path. Inwardly facing surfaces 46 on the excitation rings 44, in combination with the conductive material 40 formed on the opposing sides of the proof mass 28, form variable capacitive elements C1 and C2 which, as will be discussed in more detail below, act as a position detector, as shown in FIG. 2.

Referring to FIG. 2, the proof mass 28 is shown at an at rest or null position. In this position, the distance between the surfaces 46 of the upper and lower excitation rings 44 and the pick-off capacitance plates is equal. Since capacitance is a function of the distance between the plates and the surfaces 46, the capacitance values of the capacitive elements C1 and C2 are equal during this condition.

In response to an acceleration or force along a sensitive axis S, generally perpendicular to the plane of the proof mass 28, the proof mass 28 moves toward one or the other excitation rings 44. This displacement of the proof mass 28 changes the respective distances between the pick-off capacitance plates formed on the opposing sides of the proof mass 28 relative to the surfaces 46 on the upper and lower excitation rings 44. This change in the distance results in a change in the capacitance of the capacitance elements C1 and C2. Position detector circuitry for measuring this change in capacitance is disclosed in U.S. Pat. No. 4,634,965, herein incorporated by reference.

The difference in the values of the capacitive elements C1 and C2 is representative of the displacement of the proof mass 28 either upwardly or downwardly along the sensitive axis S, generally perpendicular to the hinge axis and perpendicular to the plane of the proof mass 28. This displacement signal is applied to the servo system which includes the magnet assemblies 22 and the torquer coils 36 and 38, which form electromagnets to return the proof mass 28 to its null position. The magnitude of the drive current to the electromagnet to return the proof mass 28 to its null position is a measure of the acceleration of the proof mass 28 along the sensitive axis.

In accordance with an important aspect of the invention, flat leaf flexures are used for the flexures 30. As mentioned above, such flat leaf flexures 30 have relatively large transverse compliance which gives the proof mass 28 two degrees of freedom. The problem with such an arrangement is that the servo system often cannot accurately and predictably respond to both degrees of freedom of the proof mass 28 at once. In order to resolve this problem, the proof mass 28, in accordance with the present invention, is configured to make the two degrees of freedom of the proof mass look like a single degree of freedom to the servo loop. Standard control theory can then be used to define the loop with predictable and robust results.

The invention is best understood by first referring to an ideal servo accelerometer as modeled in FIG. 3. In this model, the proof mass 28 is represented by the rectangular block 50 having a mass $M_1$ and a moment of inertia about its center of mass $J_0$. The center of mass 52 of the proof mass 28 is shown at a distance L from an effective hinge point of the flexure 30. As shown, the proof mass 50 is adapted to rotate an angle of $\pm\theta$ as represented by the arrow 53. The flexure 30 is represented as a torsion spring 54 having a spring constant $K_F$ having an effective hinge point, represented by the circle 56. Squeeze film damping is represented in the model by way of the squeeze film damper 58 having a damping constant C. A position detector 60 having a gain constant of $K_D$ is shown coupled by the servo amplifier to the torquer 61 shown acting through the effective hinge point of the flexure 30 and having a force constant of $K_T$.

Figure 4:
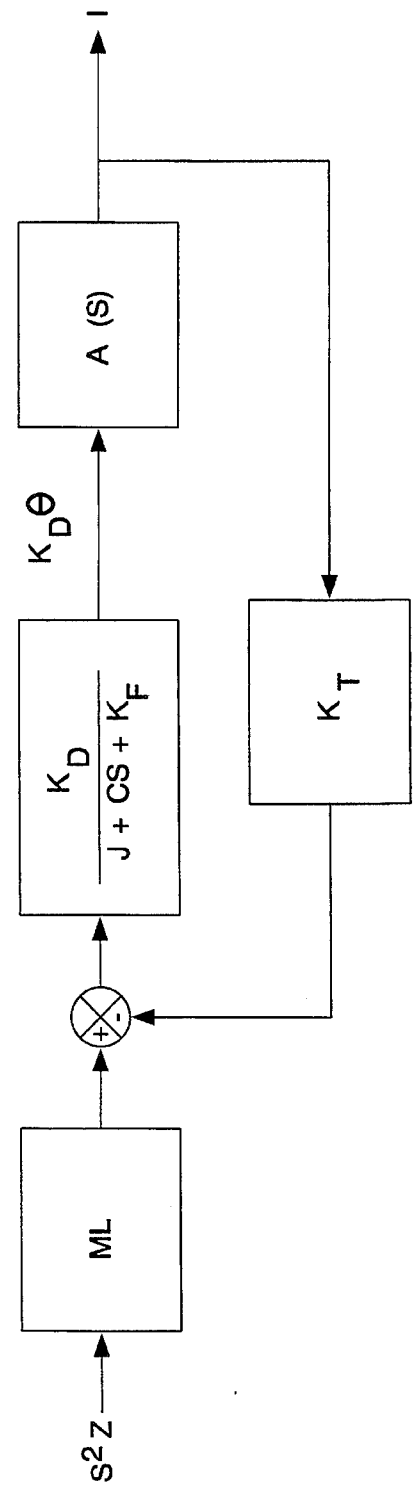
FIG. 4 is a block diagram of the mechanical model illustrated in FIG. 3.

The transfer function for the ideal servo accelerometer illustrated in FIG. 3 may be derived with reference to the block diagram in FIG. 4. For simplicity, the transfer function is illustrated in terms of LaPlace transform notation. When the accelerometer is subjected to an upward acceleration $\ddot{z}$ or $s^2 z$, the proof mass 28 deflects downwardly. This downward deflection of the proof mass 28 is detected by the position detector, represented in simplified form as $K_D$. The output of the position detector $K_D$ is amplified and fed back to the torquer represented as $K_T$, which, in turn, restores the proof mass 28 to its original null position. For an ideal accelerometer, the torquing current, I, required to force the proof mass 28 back to its null position during an acceleration condition provides a relatively convenient and generally accurate measure of the applied acceleration.

The closed loop transfer function can be derived with reference to FIG. 4 by summing the torques relative to the effective hinge point 56.

The output current I is represented by Equation 1 below:

$$I = \left[ \frac{AK_D}{Js^2 + Cs + K_F} \right] [s^2 zML - IK_T] \qquad (1)$$

where I=the torquing current output required to return the proof mass to its null position in response to an acceleration applied along the sensitive S; A=the gain of the feedback amplifier; $K_D$=the position detector constant; C=the damping constant associated with the squeeze film damping of the proof mass; $K_F$=the spring constant of the flexure; M=mass of the proof mass; L=the distance between the center of mass of the proof mass and the effective pivot point of the flexure; $K_T$=the torquer constant; J=the moment of inertia of the proof mass about the effective hinge point 56 of the flexure ($J=J_o+ML^2$); and $s^2z$=the acceleration input to the system in LaPlace transform notation.

Manipulating equation 1 yields the transfer function of the system as set forth in equation 2.

$$\frac{I}{s^2 z} = \frac{ML}{K_T} \left( \frac{AK_D K_T}{J} \right) / \left[ s^2 + \frac{c}{J} * s + \frac{K_F + AK_D K_T}{J} \right] \qquad (2)$$

Assuming that $AK_D K_T >> K_F$, which is the normal operating condition of a servo, equation 2 can be simplified as shown in equation 3:

$$\frac{I}{s^2 z} = \frac{ML}{K_T} * \omega_n^2 / [s^2 + 2\zeta\omega_n s + \omega_n^2]; \qquad (3)$$

where $\omega_n^2 \triangleq \dfrac{AK_D K_T}{J}$ and $$\zeta \triangleq \frac{c}{2\sqrt{JAK_D K_T}}$$

Equation 3 illustrates that the system is a damped second order system with a relatively high natural frequency, created primarily by the feedback amplifier gain A. Equation 3 also illustrates that the system response is almost unaffected by the flexure stiffness $K_F$. Should the amplifier gain also contain terms proportional to s, a phase shift would contribute to the damping, as well as to the natural frequency. At the low frequency limit, when s approaches zero, the ratio of I to $s^2z$ is a constant, so that I is a good measure of acceleration; the only assumption being that M, L and $K_T$ are constants.

Figure 5:
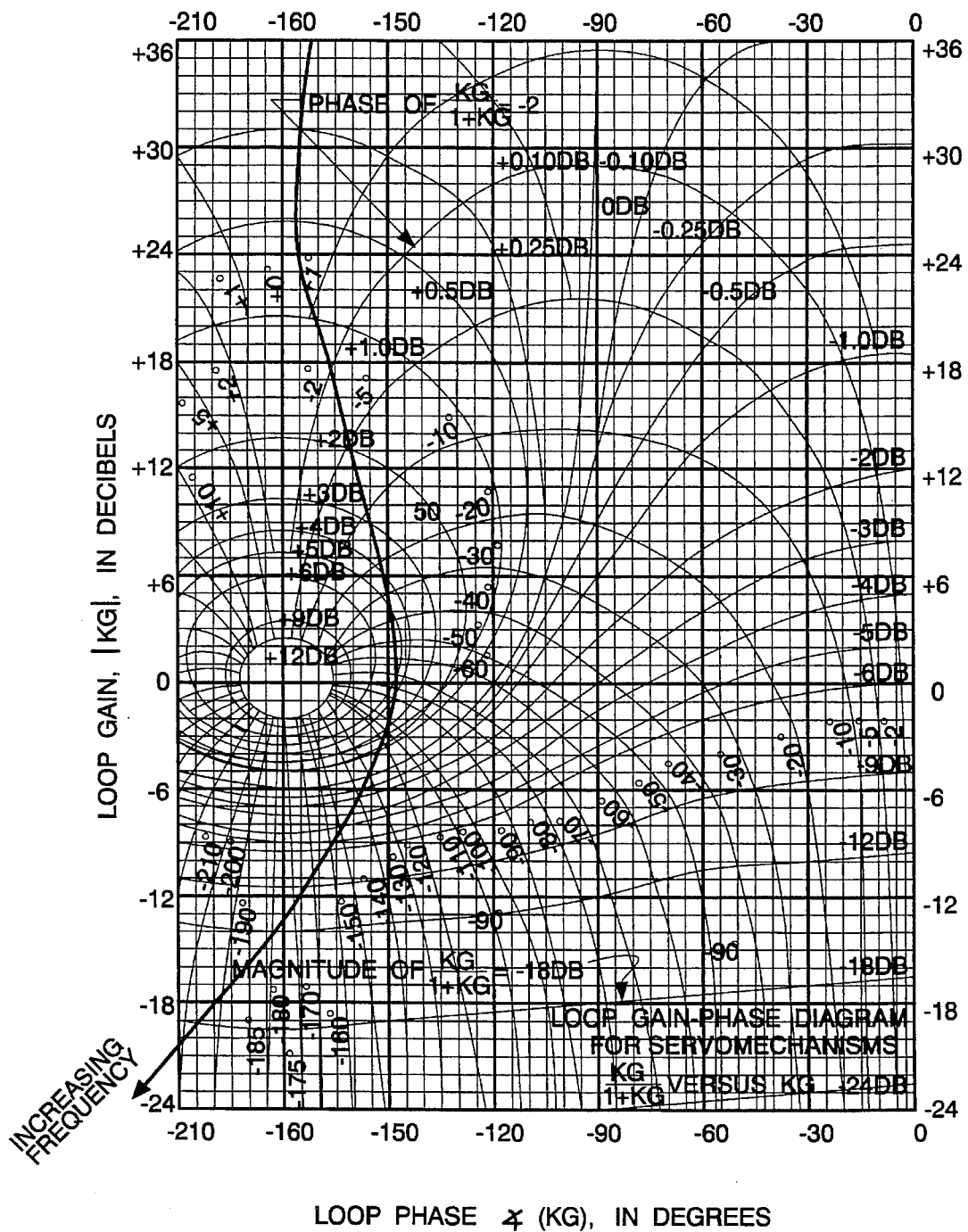
FIG. 5 is a Nichols chart illustrating the response of the mechanical model illustrated in FIG. 3.

Since the feedback path contains no frequency sensitive terms, the closed loop response can be analyzed from the open loop response in terms of a two-dimensional nomograph called a Nichols chart, illustrated in FIG. 5. Referring to FIG. 5, one set of coordinates along the horizontal and vertical axes represent the open loop response $K_G$ of the servo mechanism. In particular, these coordinates represent the gain if the feedback path represented by the torquer constant $K_T$ has unity gain. As long as the torquer constant $K_T$ is not frequency sensitive, this can be accomplished by a simple transformation which entails scaling the input. The vertical scale represents the open loop amplitude gain $K_G$ in decibels (dB) while the horizontal scale represents the phase shift in degrees. When the open loop response curve is plotted as a function of frequency, points at which the curve crosses a second set of coordinates provides the closed loop response. For example, the point on the curve corresponding to an open loop gain of −2 dB and −150° corresponds to a closed loop gain of +4 dB and −90°. This point corresponds to the natural frequency of the second order system and is near the frequency at which the maximum amplitude gain of approximately 5 dB occurs. If the gain of the amplifier were increased, the entire curve would move upward and the maximum closed loop gain would increase. In fact, if the gain were increased by 13 dB with no change in the phase shift, the curve would pass through the critical open loop point of 0 dB and −180°, where the gain would become infinite and the output would be exactly negative of the input. In such a situation, providing a feedback loop would create conditions for a self-sustaining oscillator. In the ideal mechanism illustrated in FIG. 1, the open loop phase shift is never as great as 180° and the gain can be limited by the characteristics of an electronic amplifier. In fact, this condition often is used to determine the maximum gain.

Figure 6:
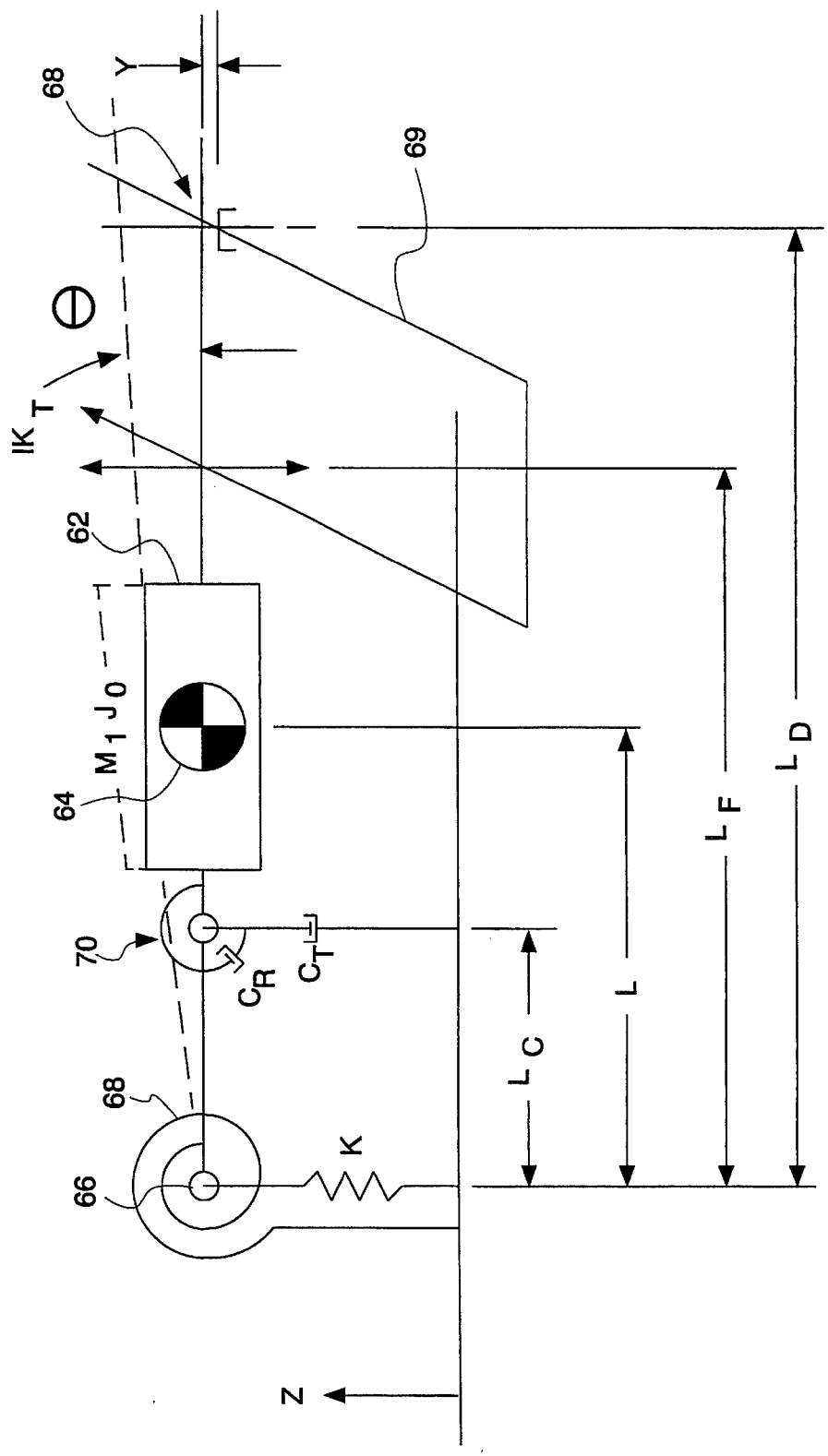
FIG. 6 is a mechanical model of a realistic servo accelerometer having two degrees of freedom.

A realistic model of a servo accelerometer utilizing flat leaf flexures and, thus, having two degrees of freedom is illustrated in FIG. 6. The proof mass is represented by the block 62 having a mass $M_1$, a moment of inertia $J_o$ about its center of mass, and said center of mass 64 located a distance L from the effective hinge point 66 of the flexure, represented by the torsion spring 68. The model in FIG. 6 is similar to the model illustrated in FIG. 3 except for two areas. In particular, at the flexure end, due to the relatively large translational compliance of the flat leaf flexure, an additional degree of freedom exists enabling the pivot point to move vertically but constrained by a relatively stiff translational spring having a spring constant K. In addition, the restoring mechanism 69 is no longer a pure torquer located arbitrarily at the pivot point, but a force mechanism which produces torque located at the effective force center at a distance $L_F$ from the pivot 66. The detector 68 is located a distance $L_D$ from the pivot 66 while the damping mechanism 70 is represented by two damping constants $C_T$ and $C_R$, representing translational and rotational damping, respectively, located a distance $L_C$ from the pivot 66. The displacement of the pick-off capacitance plates relative to the excitation rings is represented as Y.

Figure 7:
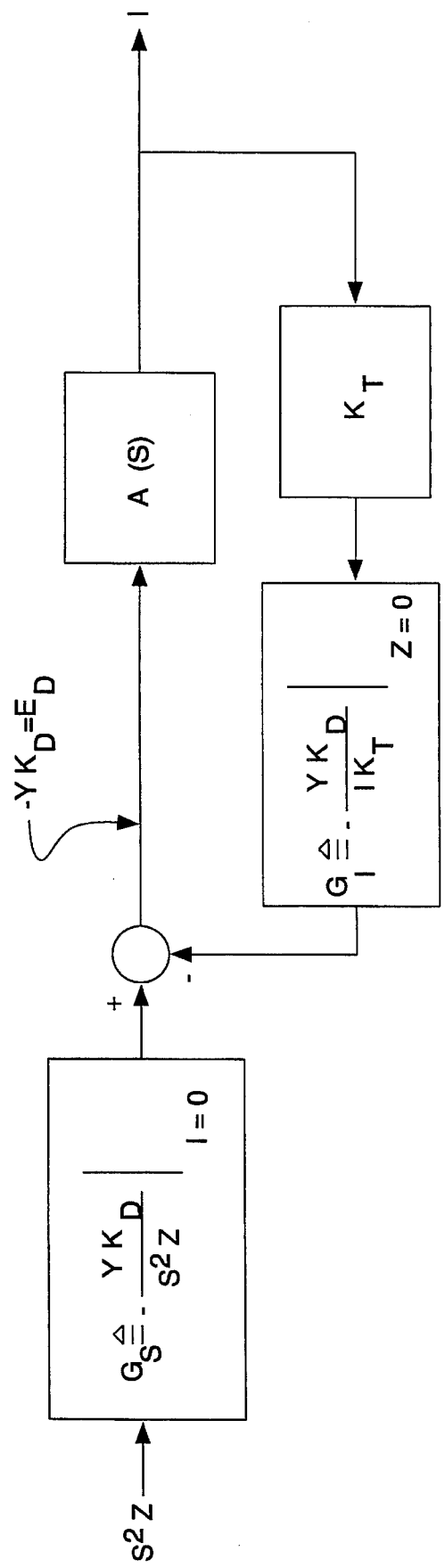
FIG. 7 is a block diagram of the mechanical model illustrated in FIG. 4.
Figure 8:
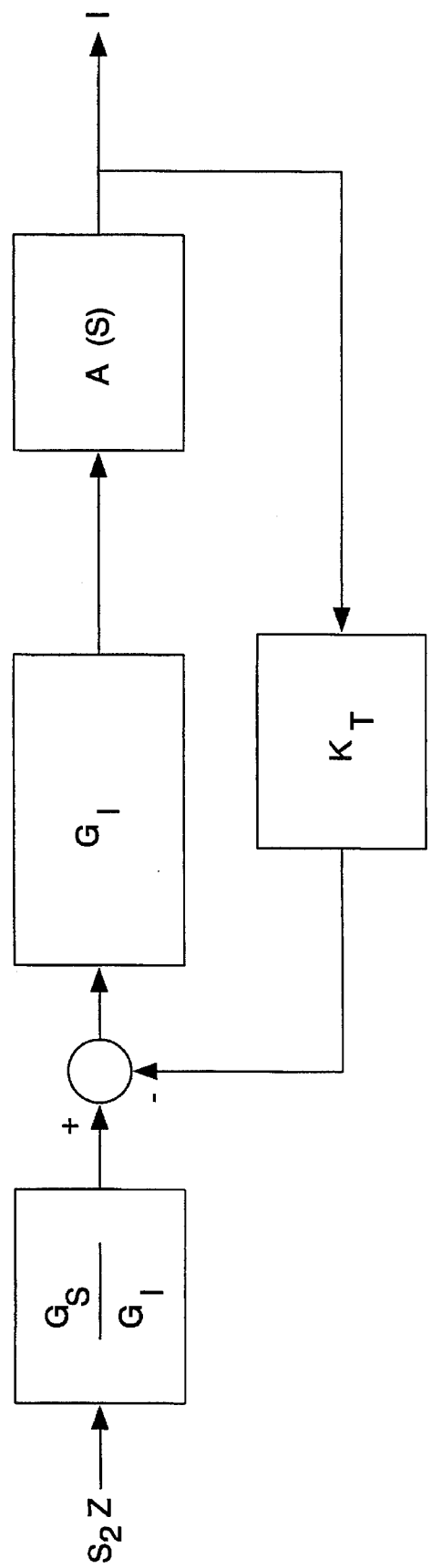
FIG. 8 is a simplified and transformed block diagram of the block diagram illustrated in FIG. 7.
Figure 9:
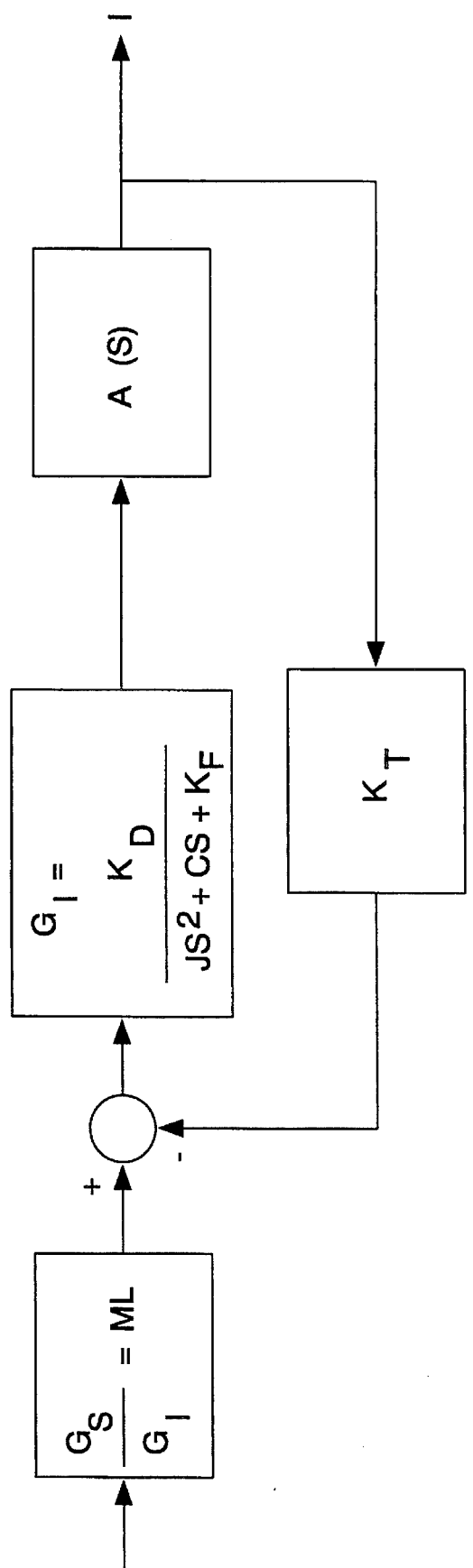
FIG. 9 is another block diagram of the ideal model illustrated in FIG. 3 in the form of the simplified block diagram of FIG. 8.

The block diagram for the realistic servo accelerometer is illustrated in FIG. 7. The second degree of freedom introduced by the translational compliance makes the analysis of the system relatively more complicated. In particular, the displacement of the proof mass produced by applying an acceleration along the sensitive axis S is no longer necessarily proportional to the current applied to the torquer coils, since the acceleration response and the current torque response are no longer necessarily equivalent. One of the complications that these inequalities can introduce is the existence of frequency sensitive terms in the feedback path, as shown in FIG. 7. However, the block diagram can be manipulated to remove such frequency sensitive terms from the feedback path as shown in FIG. 8 in order to enable the system to be analyzed by way of a Nichols chart illustrated in FIG. 10.

$G_I$ represents the response of the mechanism, as measured at the detector, to the application of a current I, while $G_s$ represents the corresponding response to the application of an acceleration, $s_2 z$. $G_I$ and $G_s$ are both frequency sensitive. Moreover, in mechanisms such as that shown in FIG. 6, the ratio $G_s/G_I$ is also frequency sensitive, in general, and will accordingly alter the overall transfer function. The mathematical manipulation to move $G_I$ outside of the servo loop, however, permits use of the Nichols Chart to analyze loop stability, and the effect of varying loop gain. As a check on the validity of the manipulation, $G_s$ and $G_I$ can be calculated for the idealized mechanic shown in FIGS. 3 and 4. $G_s$ and $G_I$ will be individually frequency sensitive, but the ratio will be a constant: $G_s/G_I = ML$, as expected.

Figure 10:
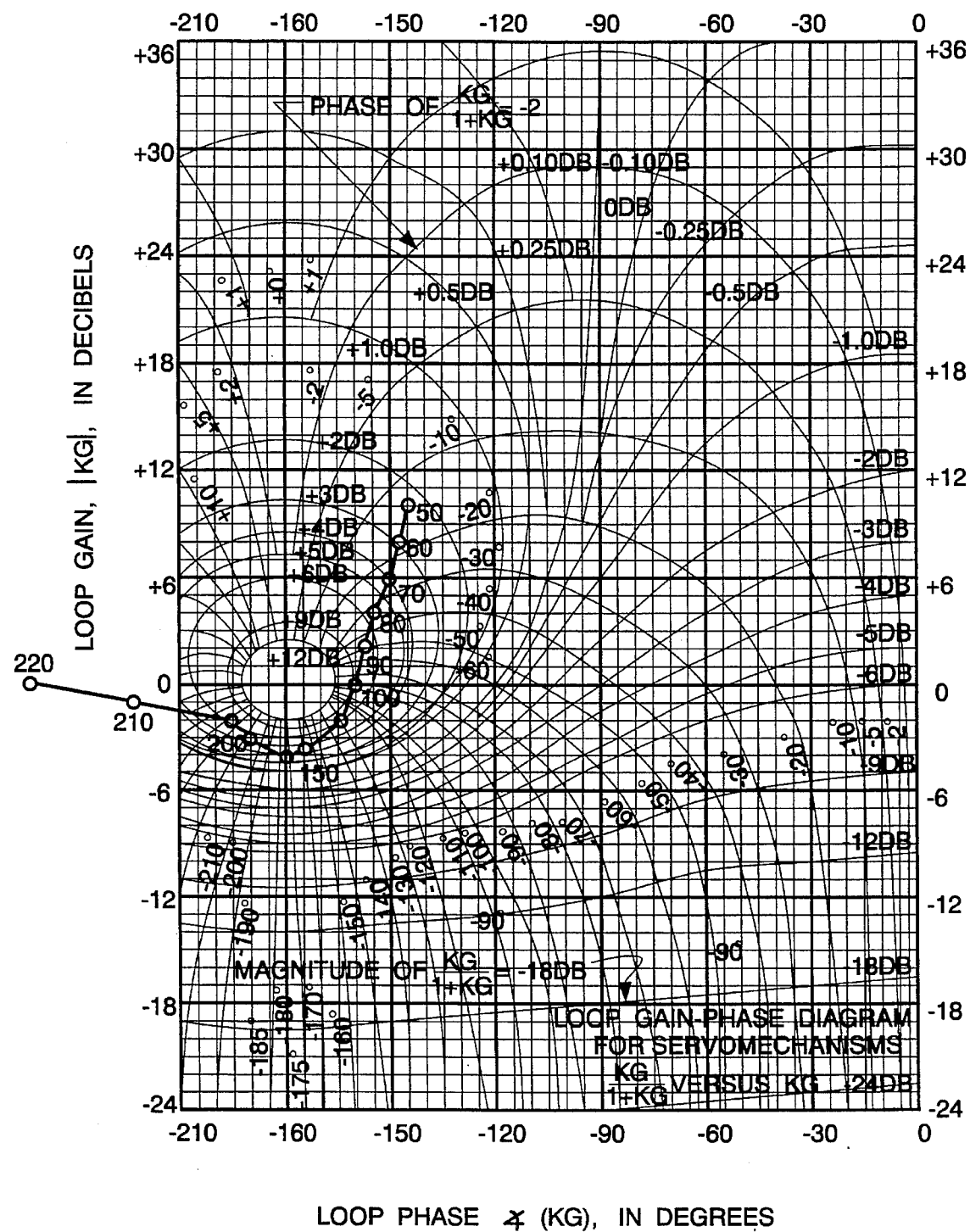
FIG. 10 is a Nichols chart illustrating the response of mechanical model illustrated in FIG. 6 without the principles of the present invention applied.

Turning to FIG. 10 a Nichols chart plot of an experimental realistic accelerometer designed with complete disregard of the principles of the invention is illustrated. As shown, the mechanism has an open loop phase shift in excess of 240° at a frequency as low as 220 Hertz, effectively preventing loop closure with sufficient gain to produce a useful bandwidth much greater than 100 Hertz. Such a limitation clearly affects the accelerometer's ability to follow complex waveforms. More importantly, such low gain allows relatively too much pendulum motion relative to the 0.001 inch or less damping/caging gaps, required for proper operation of a quartz flexure accelerometer. It is known empirically that quartz flexure accelerometers can be made with loop closure as high as 2,000 Hertz with corresponding improvements in performance but exhibit unexplained and undesirable variations in the frequency response from sensor to sensor.

As will be discussed below, the accelerometer in accordance with the present invention solves these problems. Although FIG. 6 illustrates squeeze film damping, the transfer function for the accelerometer in accordance with the present invention is derived below for an undamped case to simplify the derivation of a key quantity $G_f$, which, as mentioned above adds frequency sensitive terms in the feedback loop. Referring to FIG. 6, summing the forces vertically yields equation 4:

$$Ms^2(y - \theta(L_D - L)) + K(y - \theta L_D) = IK_T \quad (4)$$

Summing the moments about the center of mass yields equation 5:

$$J_o S^2 \theta - K(y - L_D \theta) L = IK_T(L_F - L) \quad (5)$$

In matrix form, equations 4 and 5 can be expressed as follows:

$$\begin{bmatrix} Ms^2 + K & -Ms^2 L_D + Ms^2 L - K_{LD} \\ -KL & J_o s^2 + KLL_D \end{bmatrix} \begin{bmatrix} Y \\ \theta \end{bmatrix} = \begin{bmatrix} IK_T \\ IK_T(L_F - L) \end{bmatrix}$$

With simplifying substitutions for the translational resonance $\omega_T$ and rotational resonance $\omega_o$ about the center of mass, as set forth in equations 6 and 7;

$$\omega_T^2 \triangleq K/M \quad (6)$$

$$\omega_o^2 \triangleq KL^2/J_o; \quad (7)$$

the matrix can be simplified as follows:

$$\begin{bmatrix} s^2 + \omega_T^2 & s^2(L - L_D) - \omega_T^2 L_D \\ -\omega_o^2/L & s^2 + \omega_o^2 (L_D/L) \end{bmatrix} \begin{bmatrix} Y \\ \theta \end{bmatrix} = IK_T \begin{bmatrix} 1/M \\ (L_F - L)/J_o \end{bmatrix}$$

Assuming that the transfer function $G_f$ for the torquer is as provided in equation 8;

$$G_f \triangleq YK_D/IK_T; \quad (8)$$

the solution of the matrix yields equation 9:

$$Y/IK_T = G_f/K_D = \frac{1/M[s^2 + \omega_o^2(L_D/L)] - [(L_F - L)/J_o][s^2(L - L_D) - \omega_T^2 L_D]}{[s^2 + \omega_T^2][s^2 + (L_D/L)\omega_o^2] + s^2\omega_o^2[(L - L_D)/L] - \omega_o^2 \omega_T^2(L_D/L)} \quad (9)$$

Normalizing dimensions and setting $$\delta \triangleq L_D/L \text{ and } \phi \triangleq L_F/L,$$

equation 9 can be further simplified as illustrated in equation 10;

$$Y/LIK_T = G_f/LK_D = \quad (10)$$

$$\frac{1/ML[s^2 + \delta\omega_o^2] + L[(1 - \phi)/J_o][s^2(1 - \delta) - \omega_T^2 \delta]}{[s^2 + \omega_T^2][s^2 + \delta\omega_o^2 + S^2\omega_o^2(1 - \delta) - \omega_o^2 \omega_T^2 \delta]}$$

Simplifying equation 10 yields equation 11;

$$Y/IK_T = G_f/LK_D = \quad (11)$$

$$1/MLs^2 \left[ \frac{s^2 + \delta\omega_o^2 + \frac{(ML^2/J_o)(1 - \phi)(1 - \delta)[s^2 - (\delta/1 - \delta)\omega_T^2]}{s^2 + \omega_T^2 + \omega_o^2}}{} \right]$$

In the frequency domain, equation 11 can be transformed to equation 12;

$$G_f(j\omega)/LK_D = \quad (12)$$

$$-1/\omega^2 ML \left[ \frac{\omega^2 - \delta\omega_o^2 + \frac{(ML^2/J_o)(1 - \phi)(1 - \delta)[\omega^2 - (\delta/(\delta - 1))\omega_T^2]}{\omega^2 - (\omega_T^2 + \omega_o^2)}}{} \right]$$

There are two critical frequencies $\omega_1$ and $\omega_2$ for equation 12 given by equations 13 and 14;.

$$\omega_1^2 = \omega_T^2 + \omega_o^2, \text{ where } G_f(jw) \text{ becomes infinite and} \quad (13)$$

$$\omega_2^2 = \left[ \frac{\delta\omega_o^2 + (ML^2/J_o)\,\omega_T^2 \delta(\phi - 1)}{1 + (ML^2/J_o)(\phi - 1)(\delta - 1)} \right], \text{ where} \quad (14)$$

$G_f(jw)$ goes to zero and the loop is effectively open.

Taking the ratio of the two frequencies $\omega_1$ and $\omega_2$ yields equation 15;

$$(\omega_2^2/\omega_1^2) = \frac{\delta[\omega_o^2 + (ML^2/J_o)\,\omega_T^2 (\phi - 1)]}{[1 + (ML^2/J_o)(\phi - 1)(\delta - 1)][\omega_o^2 + \omega_T^2]} \quad (15)$$

Since $\omega_o^2/\omega_T^2 = ML^2/J_o$, equation 15 can be further simplified as illustrated in equation 16.

$$(\omega_2^2/\omega_1^2) = \frac{\delta\phi}{[1 + (ML^2/J_o)(\phi - 1)(\delta - 1)][1 + J_o/ML^2]} \quad (16)$$

To see the significance of equation 16, consider a special case in which $\phi=1$ (center of force is exactly at the center of mass) and $\delta=2$ (the detector is located toward the end of the proofmass, at a distance 2L from the effective hinge point. This is an intuitively natural design condition which yields the frequency equation (17), $$(\omega_2^2/\omega_1^2) = \frac{2}{1 + J_o/ML^2} \quad (17)$$

For typical real structures, the radius of gyration is less than L so that $J_o < ML^2$ and $\omega_2 > \omega_1$. For this case, the phase asymptotes become:

$0 < \omega < \omega_1$: phase lag=180°
$\omega_1 < \omega < \omega_2$: phase lag=360°
$\omega > \omega_2$: phase lag=540°.

The relatively large phase lag as illustrated in FIG. 10 essentially represents the closed loop response of the system without applying the principles of the present invention. A more useful design would be one in which the geometry was such that $\omega_1 = \omega_2$, which, in turn, would allow the poles and zeros to cancel one another as illustrated in equation 18:

$$G_f(j\omega))/LK_D = -1/\omega^2 ML \quad (18)$$

By configuring the system such that $\omega_1 = \omega_2$, the feedback path can be closed exactly as though the mechanism illustrated in FIG. 5 would respond to the servo mechanism as in the ideal case (i.e, as though the proof mass had a single degree of freedom). Equation 19 illustrates the equality of the frequencies $\omega_1$ and $\omega_2$.

$$(\omega_2^2/\omega_1^2) = 1 = \frac{\delta\phi}{[1 + (ML^2/J_o)(\phi - 1)(\delta - 1)][1 + J_o/ML^2]} \quad (19)$$

Consider the following solutions:

(1) $\phi=1$. In this case $\delta$ must $=1+J_o/ML^2$.

(2) Conversely, by symmetry, if $\delta=1$, then $\phi$ must $=1+J_o/ML^2$.

(3) If $\phi=1+J_o/ML^2$, then $\delta$ can be anywhere.

(4) If $\delta=1+J_o/ML^2$, $\phi$ can be anywhere.

If the quantity $1+J_o/ML^2$ corresponds to the center of percussion of the pendulum with respect to the midpoint of the flexures, solutions (3) and (4) show that putting the torquer and the centroid of the position detector both at the center of percussion (as discussed below), make the position of either one non-critical and produce a design that is extremely robust with respect to production variations. Unfortunately, this solution is not ordinarily useful since other known analyses show that the static performance requires that $\phi$ be as close to unity as possible to avoid excessive S bending of the flexures under static acceleration. In particular, $\phi$ is preferably selected to be unity whereas the difference between the center of percussion and the center of mass is typically about 0.1". It is, thus, necessary for the force center to be at the center of mass while the position detector center is placed as close as possible to the center of percussion in order to achieve good dynamic performance by desensitizing the accelerometer to the effect of having the force center offset from the center of percussion. Placing the force center at the center of mass provides an additional benefit as well. In particular, placing the current driven force center at the same location on the pendulum as the inertially driven force center for translational acceleration (i.e., the center of mass) makes the functions $G_I$ and $G_s$ the same except for a scaling constant. Therefore, the ratio of $G_I/G_s$ will be independent of frequency and the pendulum will appear both to the servo and to the accelerometer output to be an ideal single degree of freedom mechanism.

The centers of percussion are defined as paired mathematical points in a rigid body which have the property that an impulse force applied to one of the points will cause the body to rotate exactly about the other point. With respect to a pendulum, the center of percussion relates to the pivot point of the pendulum. With respect to a servo accelerometer, the center of percussion is that point at which a force, such as the restoring force of a torquer, can be applied without producing a reaction force at the flexure axis (i.e., without causing "S" bending of the flat leaf flexures). When a servo accelerometer is angularly accelerated about its center of percussion, the reaction forces at the flexures are exactly sufficient to cause the proof mass to rotate with no help from the torquer. By placing the position detector at the center of percussion, the rotations of the proof mass are about two reciprocal center of percussion points; the center of percussion and the flexure axis. Since the position detector is placed at the center of percussion, the servo loop will not see rotations about that point and, thus, behaves as if it were being subjected only to an ideal single degree of freedom rotation about the hinge axis.

Referring to the servo accelerometer 20 illustrated in FIGS. 1 and 2, the effective center or centroid of the position detector (i.e., capacitive elements C1 and C2) is disposed at the center of percussion of the accelerometer 20. More specifically, the pick-off capacitance plates 40 and the excitation rings 44 are configured such that their respective centroids are disposed preferably at or as near as possible to the center of percussion of the proof mass 28. In addition, the magnet assembly or torquer 24 is configured such that its center of force or effective force center (i.e., center of mass of the torquer) is disposed preferably at or as near as to possible the center of mass of the proof mass 28.

By aligning the centroid of the position detector as near as possible to the center of percussion of the proof mass 28, the dynamic sensitivity of the system to the location of the center of force is minimized, allowing the center of force to be located at the center of mass of the proof mass 28 for best static performance. However, the offset between the center of mass and the center of percussion of the proof mass 28 is normally constrained to be relatively small (i.e., 0.1 inches) since such offsets can severely limit static acceleration of the proof mass 28. By locating the center of force of the torquer 24 at the center of mass of the proof mass 28 and, thus, near the center of percussion, sensitivity to production variations in the position of the centroids of the capacitance elements C1 and C2 is minimized. Such a configuration is robust with respect to production variations. Moreover, with such a configuration, the behavior of the proof mass 28, as seen by the torquer 24, is inherently that of an ideal single degree of freedom system.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A servo accelerometer comprising:

a mounting ring;

a proof mass;

means for rotatably suspending said proof mass relative to said mounting ring at a null position, said suspending means including one or more flat leaf flexures defining a hinge axis to enable the proof mass to rotate about said hinge axis relative to said mounting ring in response to an acceleration or force along a sensitive axis that is generally perpendicular to said hinge axis, said flat leaf flexures having transverse compliance, thereby enabling said proof mass to have two degrees of freedom;

means for restoring said proof mass to said null position when an acceleration is applied along said sensitive axis;

acceleration signal providing means for providing a signal representative of the acceleration or force applied along said sensitive axis; and means for compensating for the transverse compliance of said flat leaf flexures.

2. A servo accelerometer comprising:

a mounting ring;

a proof mass having a predetermined center of mass;

means for rotatably suspending said proof mass relative to said mounting ring at a null position, said suspending means including one or more flat leaf flexures defining a hinge axis to enable the proof mass to rotate about said hinge axis in response to an acceleration or force along a sensitive axis that is generally perpendicular to said hinge axis, said flat leaf flexures having transverse compliance, thereby enabling said proof mass to have two degrees of freedom;

means for restoring said proof mass to said null position when an acceleration is applied along said sensitive axis, said restoring means having a predetermined center of force and wherein said center of force of said restoring means is substantially coincident with said center of mass of said proof mass;

acceleration signal providing means for providing a signal representative of the acceleration or force applied along said sensitive axis; and means for compensating for the transverse compliance of said flat leaf flexures.

3. A servo accelerometer as recited in claim 2, wherein said proof mass has a predetermined center of percussion and said providing means includes means for detecting the displacement of said proof mass in response to an acceleration or force applied along the sensitive axis, said detecting means having a predetermined centroid, wherein said predetermined centroid of said detecting means is disposed substantially at said center of percussion of said proof mass.

4. A servo accelerometer comprising:

a mounting ring;

a proof mass;

means for rotatably suspending said proof mass relative to said mounting ring at a null position, said suspending means including one or more flat leaf flexures defining a hinge axis to enable the proof mass to rotate about said hinge axis in response to an acceleration or force along a sensitive axis that is generally perpendicular to said hinge axis, said flat leaf flexures having transverse compliance, thereby enabling said proof mass to have two degrees of freedom;

means for restoring said proof mass to said null position when an acceleration is applied along said sensitive axis;

acceleration signal providing means for providing a signal representative of the acceleration or force applied along said sensitive axis;

means for compensating for the transverse compliance of said flat leaf flexures, wherein said compensating means includes means for enabling said restoring means to respond as a single degree of freedom system.

5. A servo accelerometer as recited in claim 1, wherein said compensating means includes means for forcing the mechanical force of said proof mass in response to an acceleration or force along the sensitive axis to be substantially equal to the force required by said restoring means to return said proof mass to a null position.

6. A servo accelerometer comprising:

a mounting ring;

a proof mass;

means for rotatably suspending said proof mass relative to said mounting ring at a null position, said suspending means including one or more flat leaf flexures defining a hinge axis to enable the proof mass to rotate about said hinge axis in response to an acceleration or force along a sensitive axis that is generally perpendicular to said hinge axis, said flat leaf flexures having transverse compliance, thereby enabling said proof mass to have two degrees of freedom;

means for restoring said proof mass to said null position when an acceleration is applied along said sensitive axis;

acceleration signal providing means for providing a signal representative of the acceleration or force applied along said sensitive axis, wherein said acceleration signal providing means includes displacement signal providing means for providing a signal representative of the displacement of said proof mass in response to an acceleration or force applied along said sensitive axis, said displacement signal providing means including a position detector for detecting the position of said proof mass, said position detector having a predetermined centroid and said proof mass having a predetermined center of percussion, wherein said compensating means includes means for aligning said centroids of said position detector substantially at said center of percussion of said proof mass; and means for compensating for the transverse compliance of said flat leaf flexures.

7. A servo accelerometer as recited in claim 6, wherein said restoring means has a predetermined center of force and said proof mass has a predetermined center of mass and wherein said compensating means includes means for aligning said center of force of said restoring means with said center of mass of said proof mass.

8. A method for making a servo accelerometer comprising the steps of:

(a) providing a proof mass assembly having a mounting ring; a proof mass having a predetermined center of mass and a predetermined center of percussion; and one or more flat leaf flexures for suspending said proof mass relative to said mounting ring, said flat leaf flexures defining a hinge axis and enabling said proof mass to rotate relative to said mounting ring in response to an acceleration or force along a sensitive axis, generally perpendicular to said hinge axis, said flat leaf flexures having transverse compliance, thereby enabling said proof mass to have two degrees of freedom;

(b) providing means for restoring said proof mass to a null position when an acceleration or force is applied along said sensitive axis, said restoring means having a predetermined center of force;

(c) providing means for providing a signal representative of the acceleration or force applied along said sensitive axis; said providing means including means for detecting the position of said proof mass when a force or acceleration is applied along said sensitive axis; said position detecting means having a predetermined centroid; and (d) aligning said centroid of said position detecting means with the center of percussion of said proof mass.

9. The method as recited in claim 8, further including the step:

(e) aligning the center of force of said restoring means with the center of mass of said proof mass.

* * * * *